US006997058B2

(12) United States Patent
Toyoda

(10) Patent No.: US 6,997,058 B2
(45) Date of Patent: Feb. 14, 2006

(54) PRESSURE SENSOR

(75) Inventor: Inao Toyoda, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/137,544

(22) Filed: May 26, 2005

(65) Prior Publication Data

US 2005/0284228 A1    Dec. 29, 2005

(30) Foreign Application Priority Data

Jun. 29, 2004    (JP)    ............................. 2004-191243

(51) Int. Cl.
*G01L 9/04* (2006.01)
(52) U.S. Cl. ....................................................... 73/726
(58) Field of Classification Search .................. 73/706, 73/715–728, 754–756
See application file for complete search history.

(56) References Cited

U.S. PATENT DOCUMENTS 4,332,000 A * 5/1982 Petersen .................. 361/283.4
4,840,067 A    6/1989 Nishida et al.
4,986,861 A    1/1991 Nishida et al.
5,583,295 A * 12/1996 Nagase et al. ................ 73/708

FOREIGN PATENT DOCUMENTS

EP    0 913 678 A2    5/1999
JP    A-07-162019    6/1995

* cited by examiner

*Primary Examiner*—William Oen
(74) *Attorney, Agent, or Firm*—Posz Law Group, PLC

(57) ABSTRACT

A pressure sensor includes a metal stem having a diaphragm, and a semiconductor substrate in which an insulation layer is inserted between first and second semiconductor layers. A plurality of strain gauges are formed on a predetermined area of the first semiconductor layer of the semiconductor substrate, for converting a bending of the diaphragm to an electrical signal. In the pressure sensor, the strain gauges have pattern shapes insulated and separated from each other by trenches extending from a surface of the first semiconductor layer to the insulation layer. Furthermore, the second semiconductor layer has a recess portion, which is recessed from a surface of the second semiconductor layer to the insulation layer and is provided at a position corresponding to the predetermined area. The diaphragm is inserted into the recess portion, and the insulation layer is attached to a surface of the diaphragm in the recess portion.

8 Claims, 4 Drawing Sheets

PRESSURE SENSOR

CROSS REFERENCE TO RELATED APPLICATION

This application is based on Japanese Patent Application No. 2004-191243 filed on Jun. 29, 2004, the contents of which are incorporated herein by reference in its entirety.

FIELD OF THE INVENTION

The present invention relates to a pressure sensor in which a semiconductor substrate having strain gauges is fixed to a surface of a diaphragm of a metal stem. The pressure sensor detects a pressure by converting a bending of the diaphragm to an electrical signal through the strain gauges. The pressure sensor may be suitably used for detecting a pressure in a subject device of a vehicle, for example.

BACKGROUND OF THE INVENTION

A pressure sensor includes a metal stem having a diaphragm for a pressure detection, a semiconductor substrate attached to a surface of the diaphragm, and strain gauges for converting a bending of the diaphragm formed on the semiconductor substrate to an electrical signal (for example, JP-B2-7-11461 which corresponds to U.S. Pat. Nos. 4,986,861 and 4,840,067).

In the pressure sensor, the thickness of a bending portion is constructed with the thickness of the diaphragm and the thickness of the semiconductor substrate. In this case, it is necessary for both the diaphragm and the semiconductor substrate to make thinner in order to increase a sensor sensitivity. However, when the semiconductor substrate is made thinner, the strength of the semiconductor substrate is greatly deteriorated.

Furthermore, when the strain gauges are constructed with a diffused resistor that is formed using a semiconductor process, electrical insulation of the strain gauges is generally performed by PN junction. In this case, a leak current may be generated on the PN junction portion at a high temperature, and it is difficult to accurately detect the pressure at a high temperature environment.

SUMMARY OF THE INVENTION

In view of the above-described problems, it is an object of the present invention to provide a pressure sensor, which improves its sensitivity while accurately detecting a pressure of a subject device.

According to the present invention, a pressure sensor includes a metal stem having a diaphragm which is deformable in accordance with an applied pressure, a semiconductor substrate attached to a surface of the diaphragm, and a plurality of strain gauges, formed on a predetermined area of a first semiconductor layer of the semiconductor substrate, for converting a bending of the diaphragm to an electrical signal.

In the pressure sensor, the semiconductor substrate is a laminated structure in which an insulation layer is inserted between first and second semiconductor layers, the strain gauges have pattern shapes insulated and separated from each other by trenches each of which extends from a surface of the first semiconductor layer to the insulation layer. The semiconductor substrate has a recess portion which is recessed from a surface of the second semiconductor layer to the insulation layer and is provided at a position corresponding to the predetermined area. Furthermore, the diaphragm is inserted into the recess portion, and the insulation layer is attached to a surface of the diaphragm in the recess portion.

In the pressure sensor, a bending thickness portion for detecting a pressure is constructed with the thickness part of the diaphragm of the metal stem and the thickness part of the insulation layer. Therefore, a sensitivity of the pressure sensor can be improved and a pressure in a subject device can be accurately detected by using the strain gauges formed on the first semiconductor. For example, the pressure sensor can detect a fuel pressure or a brake pressure.

For example, the semiconductor substrate is a SOI substrate in which both the first and second semiconductor layers are made of silicon and the insulation layer is made of a silicon dioxide film. Furthermore, the insulation layer may be bonded to the surface of the diaphragm in the recess portion, through a glass material.

The diaphragm can be provided with a protrusion portion at a position corresponding to the recess portion of the semiconductor substrate. In this case, the protrusion portion of the diaphragm is inserted into the recess portion and attached to the insulation layer in the recess portion.

Alternatively, only the insulation layer may be attached to the diaphragm, in the recess portion within the semiconductor substrate.

As an example, the recess portion is defined by the insulation layer and the second semiconductor layer to have a trapezoid sectional shape enlarged from the insulation layer to a surface of the second semiconductor layer. In this case, the diaphragm has a protrusion portion corresponding to the shape of the recess portion, and the insulation layer of the semiconductor substrate is attached to the surface of the protrusion portion of the diaphragm in the recess portion. Therefore, the structure of the pressure sensor can be made simple.

Furthermore, the metal stem can be provided with a wall surface extending from the diaphragm outwardly and facing the surface of the second semiconductor layer, and the surface of the second semiconductor layer is attached to the wall surface of the metal stem, outside the recess portion. Therefore, even when the recess portion is provided in the semiconductor substrate, the strength of the semiconductor substrate can be effectively improved.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS (First embodiment)

Figure 1:
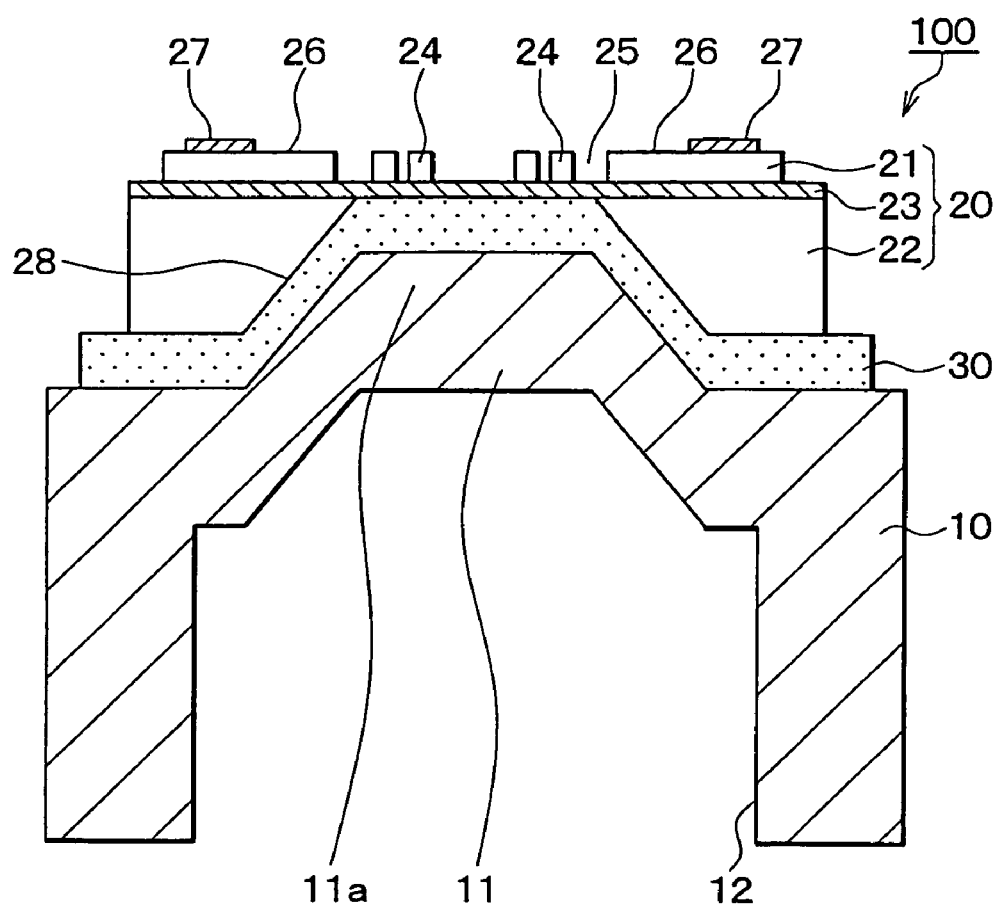
FIG. 1 is a schematic sectional view showing a pressure sensor according to a first preferred embodiment of the present invention.
Figure 2:
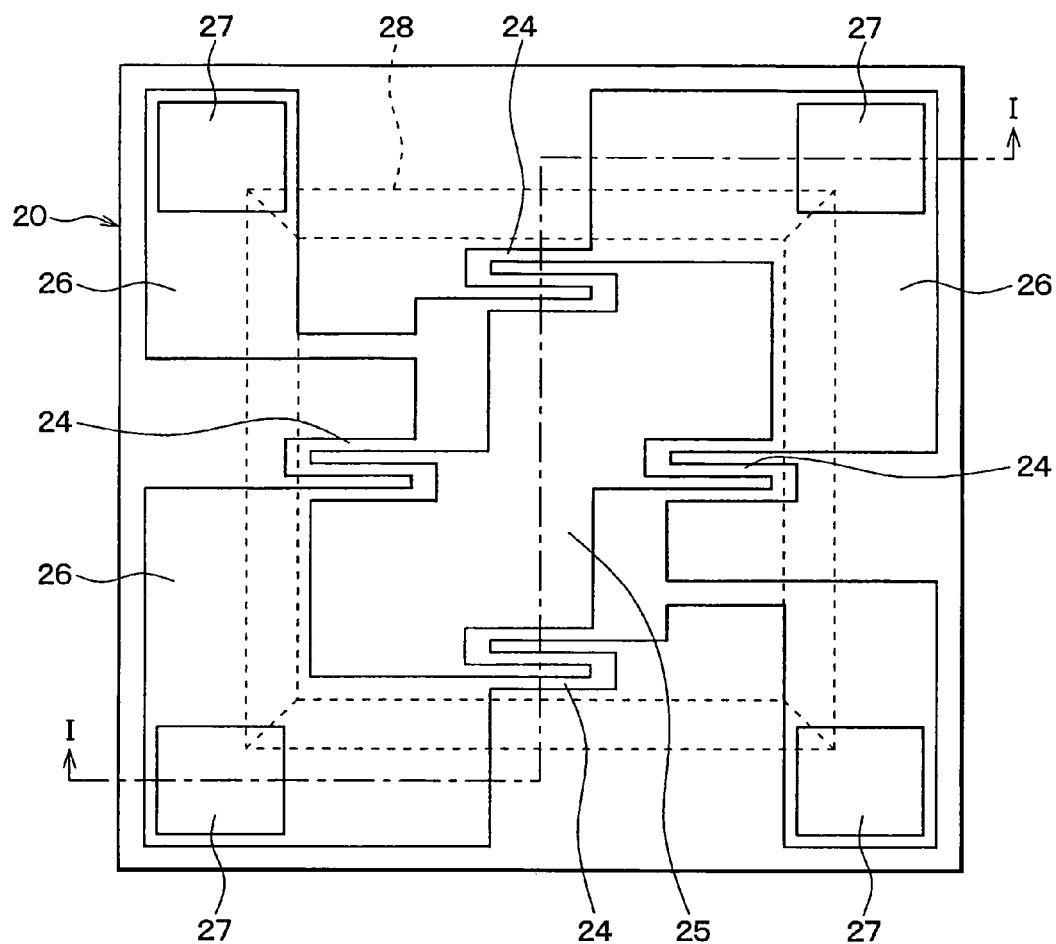
FIG. 2 is a schematic plane view of a semiconductor substrate of the pressure sensor in FIG. 1.

FIG. 1 shows a pressure sensor 100 and is a sectional view corresponding to a section taken along I—I in FIG. 2. As an example, the pressure sensor 100 can be attached to a subject device, for example, a fuel pipe in a vehicle injection system (e.g., common rail). In this case, the pressure sensor 100 detects the pressure of a liquid fuel or a gas-liquid mixing fuel in the fuel pipe, as a pressure medium.

The pressure sensor 100 includes a metal stem 10 having a diaphragm 11 for a pressure detection, a semiconductor substrate 20 attached to a surface of the diaphragm 11 in the metal stem 10, and strain gauges 24 for converting a bending (deformation) of the diaphragm 11 to an electrical signal.

The metal stem 10 is made of a Fe—Ni—Co alloy having a small coefficient of thermal expansion, for example. The metal stem 10 is formed into a hollow cylinder having a closed end portion as shown in FIG. 1. The metal stem 10 has the diaphragm 11 formed as a thin wall section in the closed end portion (top end in FIG. 1), and an open portion 12 at the other end.

Because a high pressure is applied to the metal stem 10, the material of the metal stem 10 generally needs to have a high strength. Furthermore, because the semiconductor substrate 20 made of a semiconductor material such as Si is attached to the metal stem 10 through the glass 30, a material having a low coefficient of thermal expansion is used as the material of the metal stem 10. For example, an alloy of Fe, Ni, Co or Fe, Ni is used as a main material of the metal stem 10, and Ti, Nb, Al or Ti, Nb is added in the main material as a deposition strengthening material. The metal stem 10 is formed through pressing, cutting or cold forging, etc.

The semiconductor substrate 20 is attached to a surface of the diaphragm 11 in the metal stem 10 through a bonding material having an electrical insulation. As an example, in this embodiment, the semiconductor substrate 20 is bonded to the surface of the diaphragm 11 of the metal stem 10 through a glass 30 having a low melting point.

In this embodiment, the semiconductor substrate 20 has a laminated structure in which an insulation layer 23 is inserted between the first semiconductor layer 21 and a second semiconductor layer 22. The semiconductor substrate 20 can be constructed with a silicon-on-insulator (SOI) substrate in which the first semiconductor layer 21 and the second semiconductor layer 22 are made of silicon, and the insulation layer 23 is made of a silicon dioxide film.

As shown in FIG. 1, the first semiconductor layer 21 is used as a P-type surface silicon layer and has a thickness of about 10 pm. The second semiconductor layer 22 is used as a substrate silicon layer and has a thickness of about 500 pm. Both the silicon layers 21, 22 are bonded to two surfaces of the insulation layer 23 composed of the silicon dioxide film.

As shown in FIGS. 1 and 2, the strain gauges 24 are formed on the first semiconductor layer 21 of the semiconductor substrate 20. The strain gauges 24 are insulated and separated from each other by trenches 25 formed from the surface of the first semiconductor layer 21 to the insulation layer 23.

Furthermore, as shown in FIG. 2, the strain gauges 24 are electrically connected with each other so as to form a bridge circuit which converts a resistance change corresponding to a deformation of the diaphragm 11 to an electrical signal.

As an example, four strain gauges 24 each having a folded shape are electrically connected to each other to construct a bridge circuit (Wheatstone bridge).

Wiring portions 26 partitioned from each other by the trenches 25 are formed on the first semiconductor layer 21. The wiring portions 26 are electrically connected to the strain gauges 24, respectively. A connection pad 27 for connecting to an exterior is formed on each wiring portion 26. The pads 27 can be formed by sputtering an aluminum material, for example. The pads 27 are used as pads to which bonding wires are connected.

A recess portion 28 is provided at the other side of the semiconductor substrate 20. The recess portion 28 is formed in the second semiconductor layer 22 at least a position corresponding to an area where the strain gauges 24 are formed. As shown in FIG. 1, the recess portion 28 recesses from the surface of the second semiconductor layer 22, opposite to the first semiconductor layer 21, to the insulation layer 23. The strain gauges 24 are provided at positions above the recess portion 28. As an example, the strain gauges 24 are provided within an area of a bottom portion (insulation portion 23) of the recess portion 28.

As shown in FIG. 1, the diaphragm 11 of the metal stem 10 is inserted into the recess portion 28, so that the insulation layer 23 for constituting a surface (bottom surface) of the recess portion 28 is bonded to a surface of the diaphragm. As an example, the insulation layer 23 for constituting the surface of the recess portion 28 and the surface of the diaphragm 11 are bonded through the glass 30 having a low melting point. Accordingly, the portion of the insulation layer 23, for defining the recess portion 28, is bent in accordance with a deformation of the diaphragm 11, in the semiconductor substrate 20.

In the metal stem 10, the diaphragm 11 has a protrusion portion 11a corresponding to the recess portion 28 in the semiconductor substrate 20. The protrusion portion 11a of the diaphragm 11 is inserted into the recess portion 28 to be bonded to the insulation layer 23 in the recess portion 28.

Next, a method for manufacturing the semiconductor substrate 20 will be now described. A semiconductor substrate is manufactured in a wafer state through a semiconductor process, and is separated into chip units by using a dicing cutter.

In FIGS. 3A–3D, although the manufacturing method in the wafer state is indicated, the reference numbers similar to the construction elements of the semiconductor substrate 20 shown in FIGS. 1 and 2 are used.

Figure 3A:
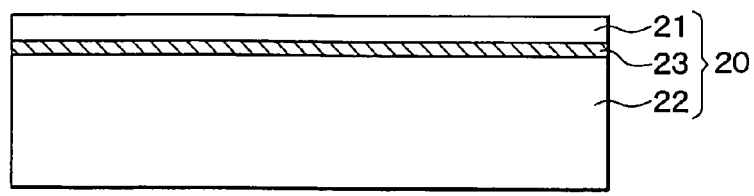
FIGS. 3A–3D are schematic sectionals views showing a method for manufacturing the semiconductor substrate.

As shown in FIG. 3A, a semiconductor wafer having a SOI substrate structure is prepared for forming the semiconductor substrate 20. In the semiconductor wafer, the first semiconductor layer 21 and the second semiconductor layer 22 are bonded to two surfaces of the insulation layer 23 that is a silicon dioxide film. That is, the first and second semiconductor layers 21, 22 are bonded to each other through the insulation layer 23.

Figure 3B:
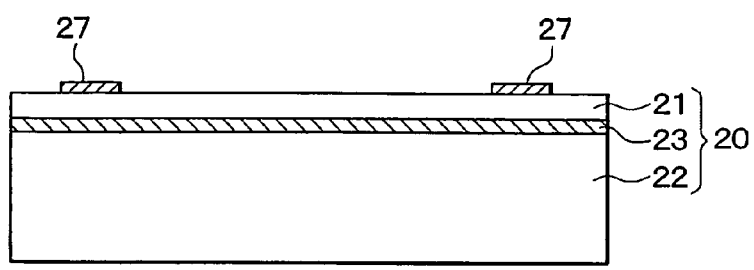

Then, as shown in FIG. 3B, the pads 27 are formed on the surface of the first semiconductor layer 21 using a film forming method such as sputtering. The pads 27 will be used for performing an electrical connection with an exterior. For example, the electrical connection with the exterior can be performed by wire bonding.

Figure 3C:
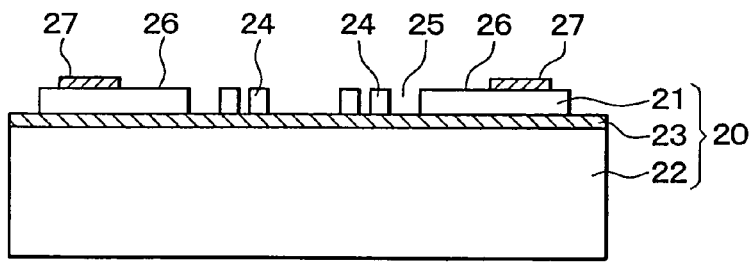

Next, as shown in FIG. 3C, the trenches 25 extending from the surface of the first semiconductor layer 21 to the insulation layer 23 are formed by performing a dry etching to the first semiconductor layer 21. Therefore, the strain gauges 24 and the wiring portions 26 having patterns partitioned by the trenches 25 are formed.

Figure 3D:
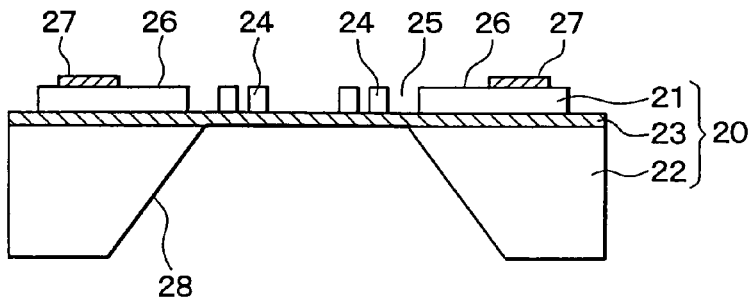

Furthermore, as shown in FIG. 3D, the recess portion 28 recessed from the surface of the second semiconductor layer 22 to the insulation layer 23 is formed by performing an etching to the second semiconductor layer 22. For example, a dry etching or an anisotropic etching using a solution of potassium hydroxide (KOH) can be performed to the second semiconductor layer 22 so as to form the recess portion 28.

In the example of FIG. 2, a recess portion 28 having a square planar shape is formed by the anisotropic etching using the solution of potassium hydroxide (KOH). However, a recess portion 28 having a round planar shape may be formed by the dry etching. Furthermore, the recess portion 28 can be formed into a trapezoid sectional shape enlarged from the insulation layer 23 to the surface of the second semiconductor layer 22, as shown in FIG. 3D.

Then, the semiconductor wafer is cut into chip units so as to form the semiconductor substrate 20 of the pressure sensor 100.

In contrast, the metal stem 10 is formed by pressing, cutting or cold forging. The semiconductor substrate 20 formed above is bonded to the surface of the diaphragm 11 of the metal stem 10 by a glass bonding. Therefore, the semiconductor substrate 20 is attached to the surface of the diaphragm 11 of the metal stem 10 through the glass 30. In the recess portion 28 of the semiconductor substrate 20, because the surface of the diaphragm 11 is bonded to the insulation layer 23 made of a silicon dioxide film, a strong connection with the glass 30 can be obtained.

The pressure sensor 100 manufactured above can be attached to a fuel pipe such that the open portion 12 of the metal stem 10 communicates with an interior of the fuel pipe. In this case, the pressure medium inside the fuel pipe is supplied to the inside of the metal stem 10 from the open portion 12 of the metal stem 10. Therefore, the pressure inside the fuel pipe is applied to a surface of the diaphragm 11, opposite to the semiconductor substrate 20. Accordingly, the diaphragm 11 and the insulation layer 23 are bent (deformed) in accordance with the applied pressure, and the strain gauges 24 above the surface of the diaphragm 11 are also bent (deformed) due to the bending (deformation) of the diaphragm and the insulation layer 23.

The strain gauges 24 change its resistance values in accordance with a strain degree, by piezoresistance effect. The resistance value of the strain gauges 24 is detected as an electrical signal so as to detect the pressure inside the fuel pipe.

For example, a predetermined voltage can be applied to the bridge circuit constructed with the strain gauges 24. In this case, a resistance balance of the bridge circuit is changed in accordance with a bending (deformation) of the diaphragm 11, and an output voltage from the bridge circuit is also changed. Accordingly, the change of the output voltage can be detected as an electrical signal.

In this embodiment, the pressure sensor 100 includes the metal stem 10 having the diaphragm 11 for a pressure detection, the semiconductor substrate 20 attached to the surface of the diaphragm 11 of the metal stem 10, and the strain gauges 24 for converting a bending of the diaphragm 11 to an electrical signal. The semiconductor substrate 20 has a laminated structure where the insulation layer 23 is inserted between the first semiconductor layer 21 and the second semiconductor layer 22.

The strain gauges 24 are formed on the first semiconductor layer 21 in the semiconductor substrate 20, and the strain gauges 24 are insulated and separated from each other by trenches 25 extending from the surface of the first semiconductor layer 21 to the insulation layer 23. Furthermore, the recess portion 28 recessed from a surface of the second semiconductor layer 22 to the insulation layer 23 is formed in the second semiconductor layer 22 at a position corresponding to the area where the strain gauges 24 are formed. In addition, the diaphragm 11 is inserted into the recess portion 28 so that the insulation layer 23 forming the bottom surface of the recess portion 28 is attached to the surface of the diaphragm 11. As an example, the insulation layer 23 forming the bottom surface of the recess portion 28 is bonded to the surface of the diaphragm 11 through a bonding material such as the glass 30.

Accordingly, a bending thickness portion is constructed with the thickness part of the diaphragm 11 of the metal stem 10 and the thickness part of the insulation layer 23 of the semiconductor substrate 20, in the pressure sensor 100. Therefore, a pressure detection can be readily accurately performed using the strain gauges 24 formed above the diaphragm 11 and the bending insulation layer 23.

In this embodiment, a bending thickness portion in the semiconductor substrate 20 can be thinned to the thickness of only the insulation layer 23. Therefore, a pressure sensitivity of the pressure sensor 100 can be effectively improved.

The strain gauges 24 are constructed with the first semiconductor layer 21 by using the piezoresistance effect. Furthermore, because the strain gauges 24 are partitioned from each other by the trenches 25, the strain gauges 24 are insulated from each other on the insulation layer 23. Therefore, the strain gauges 24 are unnecessary to be insulated and separated from each other by using PN junction. Thus, a leak current at a high temperature can be prevented in the pressure sensor 100, and a pressure of a subject device can be accurately detected using the pressure sensor 100.

In the above-described example, the semiconductor substrate 20 is a SOI substrate in which both the first and second semiconductor layers 21 and 22 are made silicon and the insulation layer 23 is formed from a silicon dioxide film. However, only when the insulation layer 23 is inserted between both the first and second semiconductor layers 21 and 22, the structure of the semiconductor substrate 20 can be suitably changed.

Furthermore, in the above-described embodiment, the insulation layer 23 forming the bottom surface of the recess portion 28 is attached to the surface of the diaphragm 11 through the glass bonding (glass 30), as an example. However, the attachment of the insulation layer 23 to the surface of the diaphragm 11 is not limited to the glass bonding (glass 30).

In the pressure sensor 100 of the above-described embodiment, the diaphragm 11 is provided with the protrusion portion 11a which protrudes at a position corresponding to the recess portion 28 of the semiconductor substrate 20. Furthermore, the protrusion portion 11a of the diaphragm 11 is inserted into the recess portion 28 and is attached to the insulation layer 23. Therefore, the tip surface of the diaphragm 11 can be readily attached to the semiconductor substrate 20.

In this embodiment, the thickness of the bending portion in the semiconductor substrate 20 can be reduced substantially to the thickness of the insulation layer 23. However, the other portion of the semiconductor substrate 20 around the recess portion 28 has a sufficient thickness including the second semiconductor layer 22. Therefore, the strength of the semiconductor substrate 20 can be sufficiently maintained. As shown in FIG. 1, the metal stem 10 has a wall surface extending from the diaphragm 11 outwardly and facing the surface of the second semiconductor layer 22, and the surface of the second semiconductor layer 22 is attached to the wall surface of the metal stem 10 outside the recess portion 28.

(Second Embodiment)

The second embodiment of the present invention will be now described with reference to FIG. 4. In the second embodiment, as shown in FIG. 4, an outer diameter of the diaphragm 11 in the metal stem 10 is made smaller than a diameter of the bottom portion of the recess portion 28.

Figure 4:
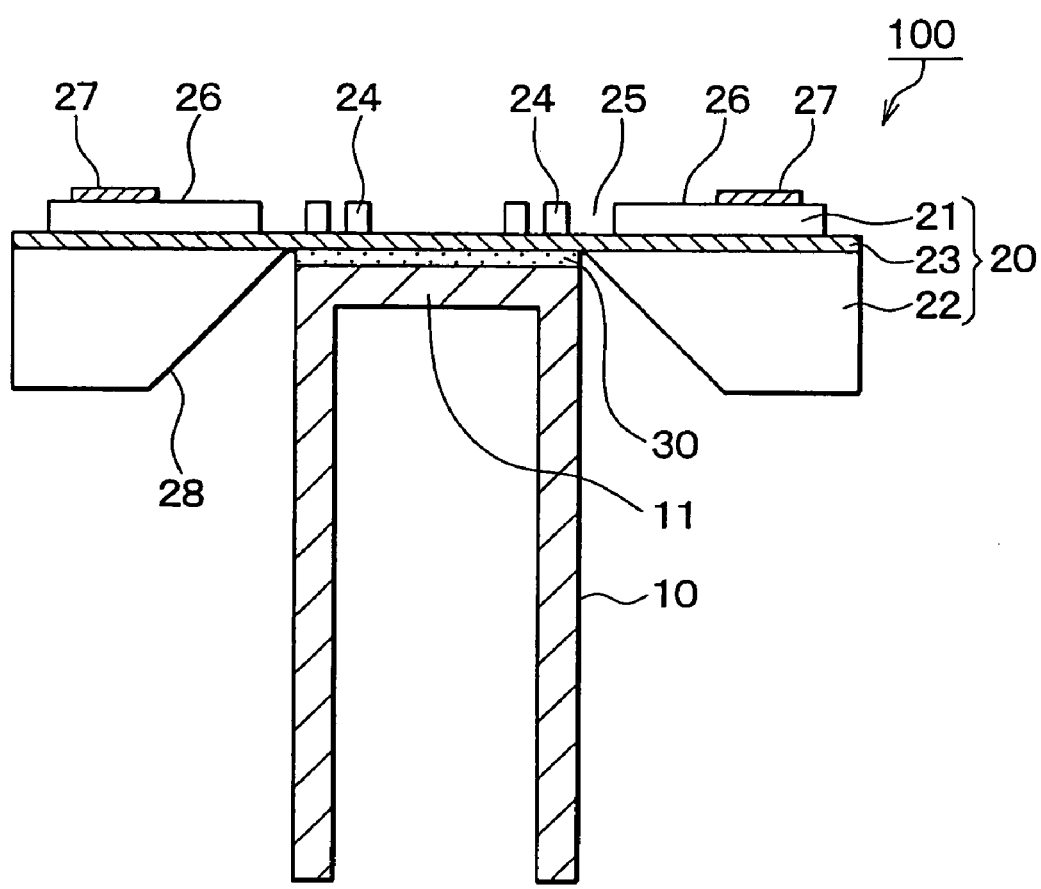
FIG. 4 is a schematic sectional view showing a pressure sensor according to a second preferred embodiment of the present invention.

As an example, the whole outer diameter of the metal stem 10 can be made smaller than the diameter of the bottom portion (the insulation layer 23) of the recess portion 28 of the semiconductor substrate 20 as shown in FIG. 4. In this case, all the diaphragm 11 is inserted into the recess portion 28, and is readily attached to the insulation layer 23.

According to the second embodiment, the surface of the diaphragm 11 can be readily attached to the semiconductor substrate 20, and the metal stem 10 can be easily formed because the metal stem 10 has a simple shape.

(Other Embodiments)

Although the present invention has been described in connection with some preferred embodiments thereof with reference to the accompanying drawings, it is to be noted that various changes and modifications will become apparent to those skilled in the art.

For example, the pattern shape of the strain gauges 24 shown in FIG. 2 is an example, and may be suitably changed. Furthermore, in the example of FIG. 2, a resistance element for detecting a temperature may be provided on the semiconductor substrate 20 in addition to the strain gauges 24.

Furthermore, the shape of the metal stem 10 may be suitably changed only when the surface of the diaphragm 11 of the metal stem 10 can be attached to the semiconductor substrate 20 in the recess portion 28.

While the invention has been described with reference to preferred embodiments thereof, it is to be understood that the invention is not limited to the exemplary embodiments and constructions. The invention is intended to cover various modification and equivalent arrangements. In addition, while the various elements of the preferred embodiments are shown in various combinations and configurations, which are exemplary, other combinations and configuration, including more, less or only a single element, are also within the spirit and scope of the invention.

What is claimed is:

1. A pressure sensor comprising:
   a metal stem having a diaphragm which is deformable in accordance with an applied pressure;
   a semiconductor substrate attached to a surface of the diaphragm, wherein the semiconductor substrate is a laminated structure in which an insulation layer is inserted between first and second semiconductor layers; and
   a plurality of strain gauges, formed on a predetermined area of the first semiconductor layer of the semiconductor substrate, for converting a bending of the diaphragm to an electrical signal, wherein:
   the strain gauges have pattern shapes insulated and separated from each other by trenches each of which extends from a surface of the first semiconductor layer to the insulation layer;
   the semiconductor substrate has a recess portion, which is recessed from a surface of the second semiconductor layer to the insulation layer and is provided at a position corresponding to the predetermined area; and
   the diaphragm is inserted into the recess portion, and the insulation layer is attached to a surface of the diaphragm in the recess portion.

2. The pressure sensor according to claim 1, wherein the semiconductor substrate is a SOI substrate in which both the first and second semiconductor layers are made of silicon and the insulation layer is made of a silicon dioxide film.

3. The pressure sensor according to claim 1, wherein the insulation layer is bonded to the surface of the diaphragm in the recess portion, through a glass material.

4. The pressure sensor according to claim 1, wherein:
   the diaphragm has a protrusion portion at a position corresponding to the recess portion of the semiconductor substrate; and
   the protrusion portion of the diaphragm is inserted into the recess portion and attached to the insulation layer in the recess portion.

5. The pressure sensor according to claim 1, wherein:
   only the insulation layer is attached to the diaphragm, in the recess portion within the semiconductor substrate.

6. The pressure sensor according to claim 1, wherein:
   the recess portion is defined by the insulation layer and the second semiconductor layer to have a trapezoid sectional shape enlarged from the insulation layer to a surface of the second semiconductor layer; and
   the diaphragm has a protrusion portion corresponding to the shape of the recess portion, and the insulation layer of the semiconductor substrate is attached to a surface of the protrusion portion in the recess portion.

7. The pressure sensor according to claim 6, wherein:
   the metal stem has a wall surface extending from the diaphragm outwardly and facing the surface of the second semiconductor layer; and
   the surface of the second semiconductor layer is attached to the wall surface of the metal stem, outside the recess portion.

8. The pressure sensor according to claim 1, wherein:
   the metal stem has a hollow shape having an open opened at an end opposite to the diaphragm; and
   a pressure medium is applied to the diaphragm through the open of the metal stem.

* * * * *